Nov. 30, 1965      N. N. LAREAU      3,220,308
LENS FOCUSING MOUNT HAVING MEANS FOR ADJUSTING
THE FOCUS DURING MANUFACTURE
Filed July 24, 1961

NORMAN N. LAREAU
INVENTOR.

BY R. Frank Smith
F. M. Emerson Holmes
ATTORNEYS

United States Patent Office 3,220,308
Patented Nov. 30, 1965

3,220,308
LENS FOCUSING MOUNT HAVING MEANS FOR ADJUSTING THE FOCUS DURING MANUFACTURE
Norman N. Lareau, Rochester, N.Y., assignor to Eastman Kodak Company, Rochester, N.Y., a corporation of New Jersey
Filed July 24, 1961, Ser. No. 126,249
3 Claims. (Cl. 88—57)

This invention relates to lens mounts, and more particularly to focusing mounts for triplet lenses.

The primary object of the invention is to provide an inexpensive focusing system incorporating a simple means for initial factory adjustment of the focus.

For many years, the Cooke triplet objective has been widely used in inexpensive and medium-priced cameras. It provides a better compromise between image quality and price at a low or medium price level than does any other lens design. The ability of manufacturers, using modern molding techniques, to produce high quality plastic lens elements for use in Cooke triplets has made it possible to reduce the price even further without any sacrifice in quality.

Unfortunately, the design of lens mounts has not kept pace with other advances in the lens-making art. Focusing lens mounts of a quality level comparable to the lens with which they are used contain many intricate threaded parts which must be carefully machined and assembled by highly skilled technicians to produce the maximum performance which the lens can give.

In addition, the cumulation of variations in the manufacture of lenses and mount parts can cause a considerable departure of the actual focal length of the finished objective from its design focal length. This can be overcome by painstaking adjustment in the assembly of each objective or by producing one of the lens elements in a series of slightly different focal lengths and selectively assembling the elements to come as close as possible to the design focal length. Either one of these methods adds to the cost of lens manufacture.

My invention overcomes each of these difficulties.

One object of my invention is to provide a simple and inexpensive means of adjusting during assembly the focal length of a triplet objective to give a predetermined back focus. Another object of my invention is to provide a focusing lens mount of sound and reliable mechanical construction, which is inexpensive to manufacture.

According to the present invention the above objects are accomplished by a very simple mechanism incorporated in a lens mount and consisting essentially of a double purpose cam ring having cams on both its front and rear surfaces. The invention comprises a combination of this inexpensive but extraordinarily precise member with the other usual members of a lens focusing system. Lens focusing systems have some reference point such as the front wall which is at a fixed distance from the film plane of a camera. A focusing assembly is mounted on the front wall. In the present invention one of the lens elements is unmovably mounted relative to the reference wall member. The lens is a front element focusing type and a focus adjustment ring surrounding the objective is rotatable by hand (against the force of friction) to move the front element. This motion involves cam followers engaging the cams on the front surface of the special cam ring mentioned above. Rotation of the focus adjustment ring moves the cam follower along the cams and moves the front element of the lens axially forward or backward.

The rear surface of the special cam ring engages cam followers also mounted on a ring surrounding the objective. Rotation of this cam follower ring moves the cam ring axially and thus permits manufacturing adjustment of the camera focus.

In preferred embodiments of the invention the rear positive and the center negative lens of a triplet are both fixedly mounted in the camera, which means that the back focus of the system is constant. The special cam ring discussed above surrounds the negative lens element which has rims integrally molded thereon including the key way which is engaged by a key on the cam ring. That is, rotation of the factory adjustment ring moves the cam ring axially but does not permit rotation thereof. Additional focusing for objects at different distances is accomplished by the camera operator merely by turning the focusing adjustment ring which turns the front lens element and its cam followers engaging the front surface of the special cam ring whose axial position was previously set during factory adjustment by rotation of the cam follower ring.

The way in which my invention achieves its objects may be seen by reference to the description below and the drawings.

Figure 1:
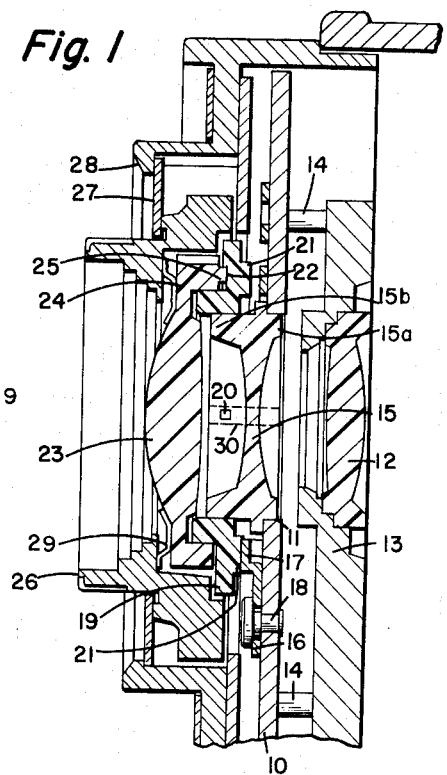
FIG. 1 is a cross sectional view of the lens mount and lens assembly, along section lines 1—1 of FIG. 4.

In FIG. 1, a front camera wall serves as the base plate 10 of a lens mount. Mounted behind an opening 11 in the wall is the rear positive lens 12 of a triplet lens; this rear lens remains fixed relative to the baseplate and in this example is fixedly mounted in the plate 13 which is spaced from the wall by spacer studs 14. The middle negative lens 15 of the triplet (having concentric therewith a rear mount ring 15a and a front mount ring 15b, both of which may be integrally molded with the lens element), is secured immovably with its rear mount ring in the opening 11. A focus adjusting ring 16 having raised lugs 17 on its face fits around the front mount ring of the negative lens and is held to the baseplate by T headed rivets 18 which allow it to rotate about the lens center with considerable frictional resistance. A cam ring 19 (having splines 20, see FIG. 2) fits over the front mount ring 15b of the negative lens, the splines 20 mating with corresponding slots 30 in the mount ring so that the cam ring may move axially on the mount ring, but cannot rotate about the negative lens.

Figure 3:
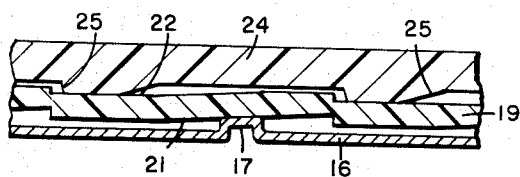
FIG. 3 is a side view of a portion of the assembly showing how certain parts mate and FIG. 4 is a plan view of a focusing ring.
Figure 2:
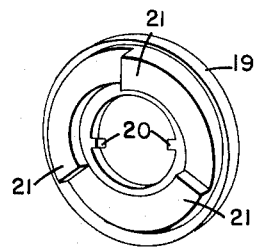
FIG. 2 is a sketch of a part of the assembly to show its construction more clearly.

The cam ring 19 is shown from the rear in FIG. 2. It has on its rear face helical ramps or cams 21 which fit against the lugs 17 of a focus adjusting ring. The front face of the cam ring has cut into it helical depressions 22 (shown in FIGS. 1 and 3) approximately but not necessarily parallel to the helical ramps 21. The front positive lens 23 has integrally molded a collar 24 which fits onto the forward extension of the cam ring so as to be free to rotate about the forward extension and move back and forth axially, but snugly enough to prevent shake. Small lugs 25 on the collar bear against the helical depressions 22 in the cam ring so that as the front lens is rotated, it moves back and forth if the lugs 25 are kept in contact with the helical depressions. The front lens is rotated by means of the focusing ring 26, which is keyed to the front lens so that the lens must rotate with the ring but is free to move back and forth axially in the ring. The focusing ring 26 is held in the camera housing extension 28 by a retainer ring 27 so that it may rotate but cannot move back and forth. A circular compression spring 29 between the front lens and the focusing ring provides the necessary axial force to hold the lugs and cams of the front lens, cam ring and focus adjusting ring in contact and to prevent axial shake.

Figure 4:
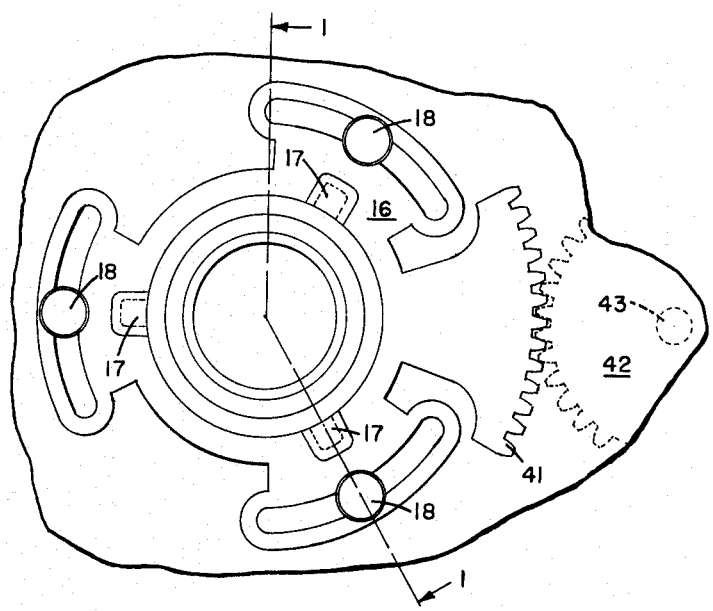

Focusing and initial focus adjustment of the complete lens assembly are both accomplished by varying the front airspace of the triplet, a well known method. As the focusing ring 26 is turned, it causes the front lens 23 together with collar 24 and lugs 25 to turn relative to the cam ring 19 which, as has been said, is held against rotation. The relative rotation of the lugs 25 and the helical depressions in the cam ring 19 forces the front lens to move axially with respect to the middle lens, thus varying the airspace. This action can best be seen from a study of FIG. 3. Of course, it is evident that raised helical cam surfaces could be provided on the front of the cam ring rather than the helical depressions shown without any change in the principle of operation. All that would be necessary would be to shorten the lugs 25 and collar 24 to maintain the same airspace. For initial focus adjustment in manufacture, the cam ring is moved axially to vary the front airspace to be proper at the "infinity" focus setting. This is accomplished by rotating the focus adjustment ring 16, which rotates the lugs 17 relative to the cam ring 19, and because the helical cam surfaces 21 are kept in contact with the lugs, the cam ring moves axially. This in turn moves the front lens axially, changing the airspace. A convenient way of rotating the focus adjusting ring is shown in FIG. 4. The focus adjusting ring has formed on it a gear sector 41. An adjusting tool consisting of a pinion 42 (shown dotted in FIG. 4) having a shaft is placed in engagement with the sector and the shaft is placed in hole 43 in the baseplate 10. Then turning a T handle on the adjusting tool shaft turns the pinion 42 which rotates the sector 41 and the adjusting ring 16 against friction. By this means an accurate adjustment of the initial focal length of the lens assembly to give the required back focus may be made easily.

The invention has been described in detail with particular reference to preferred embodiments thereof, but it will be understood that variations and modifications can be effected within the spirit and scope of the invention as described hereinabove and as defined in the appended claims.

I claim:
1. A lens focusing mount, comprising in combination, a wall member adapted to hold a focusing assembly and having a hole,
   a first lens member immovably secured in said hole, and having a longitudinal key way in the rim thereof,
   a cam ring having first and second end faces, each said face having a cam surface thereon, said cam ring surrounding said first lens member and having a key engaging and co-operating with said key way to permit said cam ring to move axially, but not to rotate, with respect to said lens member,
   an adjusting ring also surrounding said first lens member and rotatably mounted against said wall member, said adjusting ring having a cam follower adapted to bear against said second end face of said cam ring, for providing movement of the cam ring axially upon rotation of the adjusting ring,
   and a rotatably mounted second lens member having a peripheral flange provided with a cam follower adapted to bear on said first face of said cam ring, said flange being spring urged against said cam ring, for moving the second lens member axially when it is rotated.

2. A mount according to claim 1 in which said adjusting ring is frictionally held against said wall member and includes a peripheral projection for adjusting the rotational setting of the ring during manufacture.

3. A mount according to claim 2 in which said peripheral projection is a section of a gear for engagement with an adjusting tool during manufacture.

References Cited by the Examiner
UNITED STATES PATENTS
2,908,209  10/1959  Marvin et al. _____ 88—57
FOREIGN PATENTS
1,222,220  1/1960  France.

JEWELL H. PEDERSEN, *Primary Examiner.*